Patented Mar. 2, 1943

2,312,691

UNITED STATES PATENT OFFICE 2,312,691

DIAZINE DERIVATIVES

Gaetano F. D'Alelio, Pittsfield, Mass., assignor to General Electric Company, a corporation of New York No Drawing. Application November 1, 1941,
Serial No. 417,503

14 Claims. (Cl. 260—251)

This invention relates to new chemical compounds and more particularly to diazine derivatives. The invention especially is concerned with the production of new and useful pyrimidyl sulfamyl-carbocyclic-carbamyl-alkyl sulfides and pyrimidyl sulfamyl-carbocyclic-thiocarbamyl-alkyl sulfides.

The diazine derivatives of this invention may be represented graphically by the following general formula:

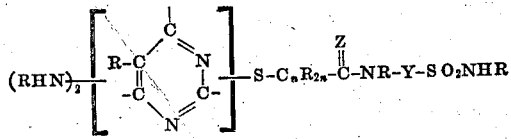

In the above formula $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and substituted hydrocarbon radicals, more particularly halo-hydrocarbon radicals. Since $n$ represents an integer which is 1 or 2, it will be seen that the linkage of the sulfamyl-carbocyclic-carbamyl-alkyl or sulfamyl-carbocyclic-thiocarbamyl-alkyl grouping to the sulfur atom in all cases will be alpha or beta to the sulfamyl-carbocyclic-carbamyl or thiocarbamyl grouping. It also will be observed that linkage of the pyrimidyl grouping to the sulfur atom is through a carbon atom.

Illustrative examples of radicals which R in the above formula may represent are: aliphatic (e. g., methyl, ethyl, propyl, isopropyl, allyl, butyl, secondary butyl, isobutyl, butenyl, amyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, phenylisopropyl, cinnamyl, etc.); and their homologues, as well as those groups with one or more of their hydrogen atoms substituted by, for example, a halogen. Specific examples of halogeno-substituted hydrocarbon radicals are chloromethyl, chloroethyl, chlorophenyl, dichlorophenyl, chlorocyclohexyl, ethyl chlorophenyl, phenyl chloroethyl, bromoethyl, bromopropyl, bromotolyl, etc. Preferably R in Formula I is hydrogen. However, there also may be produced in accordance with the present invention chemical compounds such, for instance, as those represented by the general formulas:

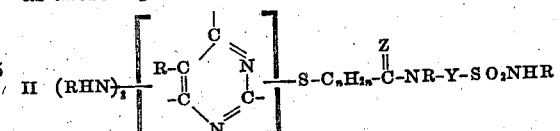

and

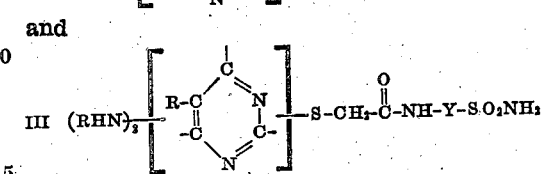

where $n$, Z, Y and R have the meanings above given with reference to Formula I.

Illustrative examples of divalent carbocyclic radicals which Y in Formulas I, II and III may represent are: arylene, e. g., phenylene, xenylene, naphthylene, etc.; alkarylene, e. g., 1,4-tolylene, para-(2,3-xylylene), etc.; cycloalkylene, e. g., cyclopentylene, cyclohexylene, etc.; cycloalkenylene, e. g., cyclopentenylene, cyclohexenylene, etc.; and their homologues, as well as those divalent carbocyclic radicals with one or more of their hydrogen atoms replaced by a substituent, e. g., halogeno, amino, acetyl, acetoxy, carboalkoxy, alkoxy, aryloxy, hydroxy, alkyl, alkenyl, etc. Specific examples of substituted divalent carbocyclic radicals are chlorophenylene, bromocyclic radicals are chlorophenylene, bromophenylene, chloronaphthylene, bromonaphthylene, bromo 1,4-tolylene, chlorocyclopentylene, chlorocyclopentenylene, bromocyclopentenyl, aminophenylene, acetophenylene, acetoxyphenylene, carbomethoxyphenylene, ethoxyphenylene, phenoxyphenylene, hydroxyphenylene, methylphenylene (tolylene), allylphenylene, etc. Preferably Y is phenylene or methylphenylene.

The new compounds of this invention may be used as chemotherapeutic agents and as intermediates in the preparation of derivatives thereof such as ureido, hydrazino, acyl, carbamyl, amidine, etc., derivatives of the individual pyrimidyl sulfamyl-carbocyclic-carbamyl (or thiocarbamyl)-alkyl sulfide. These new organic sulfides are especially valuable in the preparation of synthetic resinous compositions. Thus, they may be condensed with, for instance, aldehydes, including polymeric aldehydes and aldehyde-addition products, to yield condensation products of particular utility in the plastics and coating arts. Such condensation products are more fully described and are specifically claimed in my copending application Serial No. 417,505, filed concurrently herewith and assigned to the same assignee as the present invention. These new organic sulfides also may be compounded with rubber, both natural and synthetic, to modify the properties of the rubber.

Various methods may be employed to produce the chemical compounds of this invention. I prefer to prepare them by effecting reaction between a diamino [(—NHR)₂] mercapto pyrimidine and a sulfamyl-carbocyclic-carbamyl (or thiocarbamyl)-alkyl halide in the presence of a hydrohalide acceptor. Illustrative examples of mercapto pyrimidines that may be used, depending upon the particular sulfide desired, are:

2-mercapto 4,6-diamino pyrimidine
2-mercapto 4-bromotoluido 6-benzylamino pyrimidine
2-mercapto 4-phenylchloroethylamino 6-phenethylamino pyrimidine
2-mercapto 4-chloroanilino 6-ethylphenylamino pyrimidine
2-mercapto 4 - cycloheptylamino 6 - isopropylphenylamino pyrimidine
2-mercapto 4,6-diamino 5-methyl pyrimidine
2-mercapto 4,6-di-(methylamino) pyrimidine
2-mercapto 4,6-di-(methylamino) 5-methyl pyrimidine
2-mercapto 4-chloroethylamino 6-methylamino pyrimidine
2-mercapto 4,6-di-(anilino) pyrimidine
2-mercapto 4,6-di-(anilino) 5-butyl pyrimidine
2-mercapto 4-xenylamino 5-cyclopentyl 6-amylamino pyrimidine
2-toluido 4-mercapto 5-cyclohexenyl 6-amino pyrimidine (2-toluido 4-amino 5-cyclohexenyl 6-mercapto pyrimidine)
2-mercapto 4-amino 6-ethylamino pyrimidine
2-mercapto 4,6-di-(propylamino) pyrimidine
2-allylamino 4-mercapto 5-phenyl 6-amino pyrimidine
2-isoamylamino 4-mercapto 6-chlorophenylamino pyrimidine
2-dichloroanilino 4-mercapto 5-tolyl 6-propylamino pyrimidine
2-cycloheptylamino 4-mercapto 6-isobutylamino pyrimidine
2-mercapto 4-allylamino 6-butylamino pyrimidine
2-mercapto 4-isobutylamino 6-cyclopentylamino pyrimidine
2-mercapto 4-(3'-butenylamino) 6-isopropylamino pyrimidine
2-mercapto 4-amino 6-chloroxenylamino pyrimidine
2-mercapto 4-ethylphenylamino 5-naphthyl 6-xylidino pyrimidine
2-mercapto 4-isopropylanilino 5-benzyl 6-benzylamino pyrimidine
2-mercapto 4-phenethylamino 5-(2'-butenyl) 6-cyclopentenylamino pyrimidine
2-mercapto 4,6-diamino 5-bromotolyl pyrimidine
2-mercapto 4-amino 5-phenylisopropyl 6-chlorocyclohexylamino pyrimidine
2-mercapto 4-isobutylamino 6-bromonaphthylamino pyrimidine
2-mercapto 4,6-diamino 5-phenylpropyl pyrimidine
2-mercapto 4-chlorobenzylamino 5-chlorobutyl 6-bromoethylamino pyrimidine
2-mercapto 4-amino 5-ethylchlorophenyl 6-sec.-butylamino pyrimidine
2-mercapto 4-pentylamino 6-cyclohexylamino pyrimidine 2-mercapto 4-n-hexylamino 6-xenylamino pyrimidine
2-mercapto 4-cyclohexenylamino 6-naphthylamino pyrimidine
2-mercapto 4-amino 6-bromoethylamino pyrimidine
2-mercapto 4-amino 6-methylamino pyrimidine
2-mercapto 4-aminoanilino 6-ethylphenylamino pyrimidine
2-mercapto 4-amino 6-benzylamino pyrimidine
2-mercapto 4-chlorocyclopentylamino 6-toluido pyrimidine Illustrative examples of sulfamyl-carbocyclic-carbamyl-alkyl halides and sulfamyl-carbocyclic-thiocarbamyl-alkyl halides that may be employed, depending upon the particular end-product sought, are:

Para-sulfamyl-phenyl-carbamyl chloro methane
Alpha-(para-sulfamyl-phenyl - carbamyl) beta-chloro ethane
Alpha-(meta-sulfamyl-phenyl-carbamyl) alpha-chloro ethane
Alpha-[para - (sulfonyl methylamide) - phenyl-thiocarbamyl] alpha-chloro pentane
Ortho-sulfamyl-phenyl-(methyl)-carbamyl bromo methane
Alpha-(4-sulfamyl - naphthyl - [1] - carbamyl) beta-chloro 3'-butene
Alpha-(para-sulfamyl -chlorophenyl - carbamyl) alpha-ethyl beta-phenyl beta-bromo ethane
Para-(sulfonyl pentylamide)-tolyl-carbamyl cyclopentyl chloro methane
Para - (sulfonyl 3 - butenylamide) - chlorotolyl - (butyl)-carbamyl bromo methane
Para - (sulfonyl cyclohexylamide) - phenyl - (cyclopentyl)-thiocarbamyl chloro methane
Para-(sulfonyl phenylamide) - phenyl - (chloroethyl)-carbamyl bromo methane
4 - (sulfonyl chlorotolylamide) - cyclohexyl - (phenyl)-carbamyl chloro methane
3 - sulfamyl - cyclopentyl - carbamyl tolyl chloro methane
Alpha - [para - (sulfonyl propylphenylamide) - phenyl - (bromophenyl) - thiocarbamyl] beta-chloro ethane
Alpha-[para-(sulfonyl phenylchloroethylamide)-phenyl-(xenyl) - carbamyl] alpha - chlorotolyl beta-chloro ethane
Ortho-(sulfonyl chloroethylamide)-phenyl-carbamyl chloro methane
Meta - (sulfonyl naphthylamide) - phenyl - carbamyl iodo methane
Para-sulfamyl-phenyl-carbamyl alpha - (bromophenyl) beta-chloro ethane
Para - (sulfonyl isobutylphenylamide) - phenyl - carbamyl naphthyl chloro methane Various hydrohalide acceptors may be employed. I prefer to use a hydrohalide acceptor that will react with the mercapto pyrimidine to form a water-soluble salt. Examples of such acceptors are the alkali-metal hydroxides, e. g., sodium hydroxide, potassium hydroxide, etc. Additional examples of hydrohalide acceptors that may be used are other inorganic bases, e. g., calcium hydroxide, barium hydroxide, ammonium hydroxide, etc.; carbonates of inorganic bases, including the carbonates of alkali-metals; organic amines such as tertiary amines, e. g., trimethyl amine, triethyl amine, tributyl amine, pyridine, dimethyl aniline, quinoline, etc.; quaternary ammonium bases, e. g., tetramethyl ammonium hydroxide, etc.; and the like.

The reaction between the mercapto diamino pyrimidine and the sulfamyl - carbocyclic - carbamyl (or thiocarbamyl)-alkyl halide may be carried out in any suitable manner, but preferably is effected in the presence of a suitable solvent or mixture of solvents. Although various solvents and solvent mixtures may be employed, for economic reasons and because of their eminent suitability I prefer to use water or a mixture of water and alcohol. The reaction may be carried out under a variety of temperature and pressure conditions, for instance at normal or at elevated temperatures and at atmospheric, sub-atmospheric or super-atmospheric pressures. However, normal pressures are preferred for convenience.

The above reaction may be represented by the following general equation:

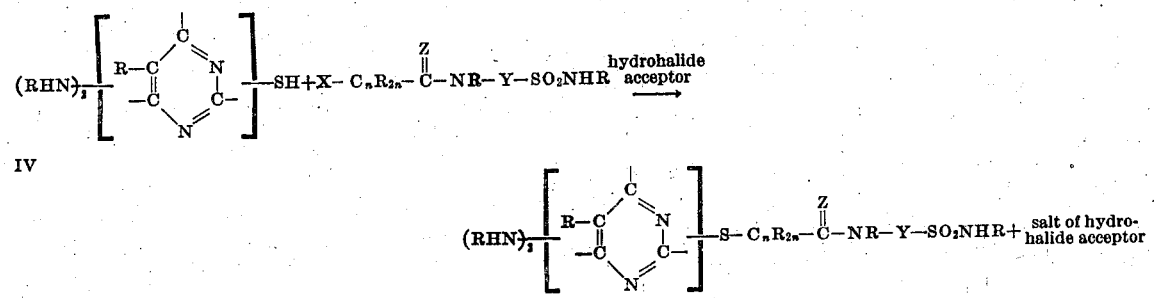

IV

In the above equation X represents halogen, and $n$, Z, Y and R have the same meanings as given above with reference to Formula I.

The new chemical compounds of this invention also may be prepared by effecting reaction between a halogenated diamino pyrimidine and a sulfamyl-carbocyclic-carbamyl or -thiocarbamyl mercapto alkane in the presence of a hydrohalide acceptor. This reaction may be carried out by any suitable means but preferably is effected in the presence of an anhydrous solvent. An anhydrous solvent, e. g., alcohol, is desirable because one of the reactants, namely, the halogenated pyrimidine, is hydrolyzable. The other conditions of reaction may be the same as described above with reference to the first-mentioned method of preparation.

Illustrative examples of halogenated diamino pyrimidines that may be used, depending on the end-product desired, are:

2-chloro 4,6-diamino pyrimidine
2-chloro 4,6-di-(methylamino) pyrimidine
2-chloro 4,6-di-(anilino) pyrimidine
2-bromo 4-amino 6-ethylamino pyrimidine
2-chloro 4,6-di-(propylamino) pyrimidine
2-bromo 4,6-di-(methylamino) 5-methyl pyrimidine
2-chloro 4-methylamino 6-chloroethylamino pyrimidine
2-iodo 4,6-di-(anilino) 5-butyl pyrimidine
2-bromo 4-allylamino 6-butylamino pyrimidine
2-chloro 4-isobutylamino 6-cyclopentylamino pyrimidine
2-chloro 4-(3'-butenylamino) 6-isopropylamino pyrimidine
2-chloro 4-amylamino 6-cyclohexylamino pyrimidine
2-chloro 4-amylamino 5-cyclopentyl 6-xenylamino pyrimidine
2-toluido 4-bromo 5-cyclohexenyl 6-amino pyrimidine (2-toluido 4-amino 5-cyclohexenyl 6-bromo pyrimidine)
2-allylamino 4-chloro 5-phenyl 6-amino pyrimidine
2-isoamylamino 4-chloro 6-chlorophenylamino pyrimidine
2-chloro 4-amylamino 6-cyclohexylamino pyrimidine
2-chloro 4-$n$-hexylamino 6-xenylamino pyrimidine
2-bromo 4-cyclohexenylamino 5-chlorocyclohexenyl 6-naphthylamino pyrimidine
2-chloro 4-chlorocyclopentylamino 6-toluido pyrimdine
2-dichloroanilino 4-chloro 5-tolyl 6-propylamino pyrimidine
2-cycloheptylamino 4-bromo 5-isobutylamino pyrimidine
2-chloro 4-amino 6-chloroxenylamino pyrimidine
2-chloro 4-ethylphenylamino 5-naphthyl 6-xylidino pyrimidine
2-chloro 4-isopropylanilino 5-benzyl 6-benzylamino pyrimidine
2-bromo 4-phenethylamino 5-(2'-butenyl) 6-cyclopentenylamino pyrimidine
2-chloro 4,6-diamino 5-bromotolyl pyrimidine
2-bromo 4-amino 5-phenylisopropyl 6-chlorocyclohexylamino pyrimidine.
2-chloro 4-bromonaphthylamino 6-isobutylamino pyrimidine
2-chloro 4,6-diamino 5-phenylpropyl pyrimidine
2-chloro 4-bromoethylamino 5-chlorobutyl 6-chlorobenzylamino pyrimidine
2-chloro 4-amino 5-chloroethylphenyl 6-sec.-butylamino pyrimidine
2-iodo 4-amino 6-bromoethylamino pyrimidine
2-bromo 4-dichloroanilino 6-chloroethylamino pyrimidine
2-chloro 4-bromotoluido 6-benzylamino pyrimidine
2-chloro 4-aminoanilino 6-ethylamino pyrimidine
2-chloro 4-phenylchloroethylamino 6-phenethylamino pyrimidine
2-chloro 4-chlorocycloheptylamino 6-isopropylamino pyrimidine
2-chloro 4-isopropylanilino 6-phenylpropylamino pyrimidine Illustrative examples of sulfamyl-carbocyclic-carbamyl or thiocarbamyl mercapto alkanes that may be used, depending upon the particular end-product desired, are:

Para-sulfamyl-phenyl-carbamyl mercapto methane
Alpha-(para-sulfamyl - phenyl - carbamyl) beta-mercapto ethane
Alpha-(meta-sulfamyl-phenyl-carbamyl) alpha-mercapto ethane
Alpha - [para - (sulfonyl methylamide) - phenyl-thiocarbamyl] alpha-mercapto pentane
Ortho-sulfamyl-phenyl-(methyl)-carbamyl mercapto methane
Alpha-(4-sulfamyl - naphthyl-1-carbamyl) beta-mercapto 3'-butene
Alpha-(para-sulfamyl-chlorophenyl - carbamyl) alpha-ethyl beta-phenyl beta-mercapto ethane Para-(sulfonyl pentylamide)-tolyl-carbamyl cyclopentyl mercapto methane Para-(sulfonyl 3-butenylamide)-chlorotolyl-(butyl)-carbamyl mercapto methane Para-(sulfonyl cyclohexylamide)-phenyl-(cyclopentyl)-thiocarbamyl mercapto methane Para-(sulfonyl phenylamide) - phenyl - (chloroethyl)-carbamyl mercapto methane.

4-(sulfonyl chlorotolylamide)-cyclohexyl-(phenyl)-carbamyl mercapto methane

Alpha - [para - (sulfonyl propylphenylamide)-phenyl - (bromophenyl) - thiocarbamyl] beta-mercapto ethane Alpha-[para-(sulfonyl phenylchloroethylamide)-phenyl - (xenyl) - carbamyl] alpha-chlorotolyl beta-mercapto ethane Meta - (sulfonyl naphthylamide) - phenyl - carbamyl mercapto methane Ortho-(sulfonyl chloroethylamide)-phenyl - carbamyl mercapto methane Para-sulfamyl-phenyl - carbamyl alpha-(bromophenyl) beta-mercapto methane Para - (sulfonyl butylphenylamide)-phenyl-carbamyl naphthyl mercapto methane Alpha-[(sulfonyl isopropylamide)-cyclohexenyl-(methyl)-carbamyl] alpha, beta-di-(phenyl) alpha-methyl beta-chlorobutyl beta-mercapto ethane The hydrohalide acceptor may be the same as described above with reference to the first-named method of preparing the compounds of this invention.

The general reaction for this alternative method of preparing my new chemical compounds is illustrated by the following equation:

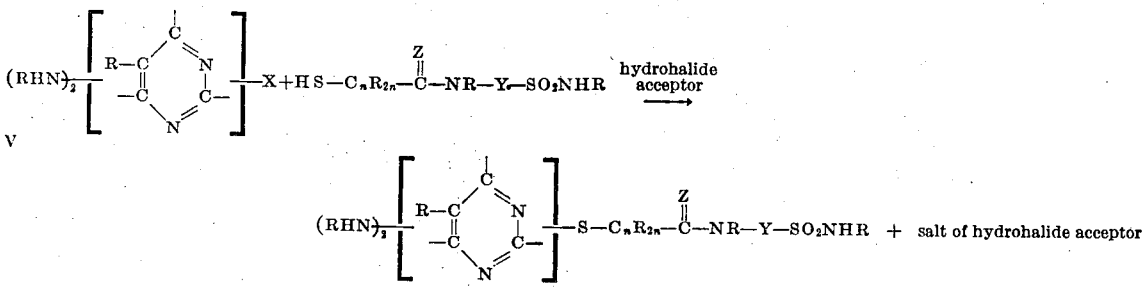

In the above equation X represents halogen, and $n$, Z, Y and R have the same meanings as given above with reference to Formula I.

In order that those skilled in the art better may understand how the present invention may be carried into effect, the following specific examples are given. All parts are by weight.

*Example 1*

This example illustrates the preparation of 4,6-diamino pyrimidyl-2 para-sulfamyl-phenyl-carbamyl-methyl sulfide, the formula for which is:

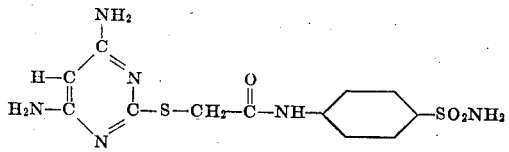

| | Parts |
|---|---|
| 2-mercapto 4,6-diamino pyrimidine | 114 |
| Para - (chloroacetamido) benzene sulfonamide | 200 |
| Sodium hydroxide | 34 |

The sodium hydroxide was dissolved in 600 parts water and the 2-mercapto 4,6-diamino pyrimidine was then added and stirred until a clear solution resulted. A second solution was prepared by dissolving 200 parts para-(chloroacetamido) benzene sulfonamide in 3500 parts of an aqueous alcohol solution containing 750 parts water. The two solutions were heated separately and then mixed. The resulting homogeneous solution was allowed to stand for one hour while cooling. Thereafter it was heated on a steam plate. A voluminous precipitate formed. The reaction mass was cooled at about 40° to 45° F. for about 16 hours and then filtered. The residue comprising 4,6-diamino pyrimidyl-2 para-sulamyl - phenyl - carbamyl - methyl sulfide was washed free of water-soluble salts and then dried at 70° C. The yield of dried product was 87.5%. Its melting point was 207° to 210° C. A nitrogen determination showed that it contained 22.8% nitrogen, which checks with the theoretical nitrogen content of 4,6-diamino pyrimidyl para-sulfamyl-phenyl-carbamyl-methyl sulfide within the limits of experimental error.

*Example 2*

2,6-diamino pyrimidyl-4 para-sulfamyl-phenyl-carbamyl-methyl sulfide is produced in the same manner as described under Example 1 with the exception that 114 parts 4-mercapto 2,6-diamino pyrimidine is used instead of 114 parts 2-mercapto 4,6-diamino pyrimidine.

*Example 3*

4,6-diamino pyrimidyl-2 para-sulfamyl-phenyl-thiocarbamy-methyl sulfide is prepared in essentially the same manner as set forth under Example 1 with the exception that, instead of para-(chloroacetamido) benzene sulfonamide, an equivalent amount of para-(chlorothioacetamido) benzene sulfonamide is employed.

*Example 4*

4,6-diamino pyrimidyl-2 para-sulfamyl-tolyl-carbamyl-methyl sulfide is prepared in essentially the same manner as described under Example 1 with the exception that an equivalent amount of para-(chloroacetamido) toluene sulfonamide is used instead of para-(chloroacetamido) benzene sulfonamide.

Other examples of the new chemical compounds of this invention are shown below:

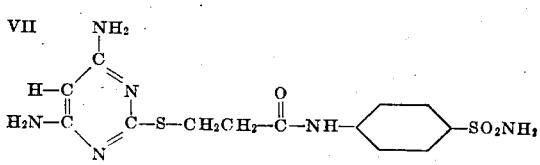

4,6-diamino pyrimidyl-2 beta-(para-sulfamyl-phenyl-carbamyl-ethyl) sulfide

VIII 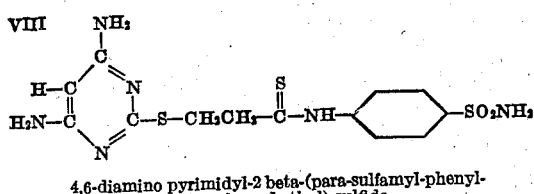

4,6-diamino pyrimidyl-2 beta-(para-sulfamyl-phenyl-thiocarbamyl-ethyl) sulfide

IX 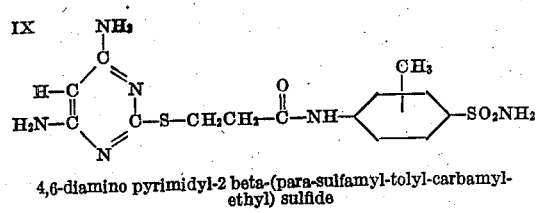

4,6-diamino pyrimidyl-2 beta-(para-sulfamyl-tolyl-carbamyl-ethyl) sulfide

X 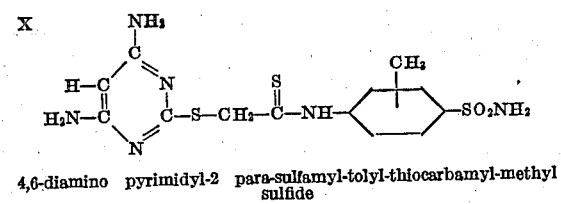

4,6-diamino pyrimidyl-2 para-sulfamyl-tolyl-thiocarbamyl-methyl sulfide

XI 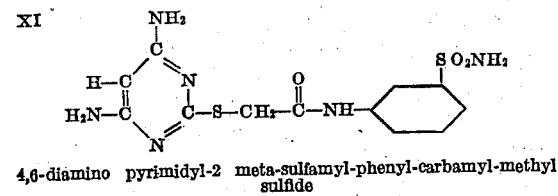

4,6-diamino pyrimidyl-2 meta-sulfamyl-phenyl-carbamyl-methyl sulfide

XII 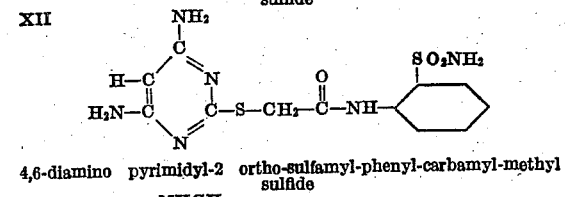

4,6-diamino pyrimidyl-2 ortho-sulfamyl-phenyl-carbamyl-methyl sulfide

XIII 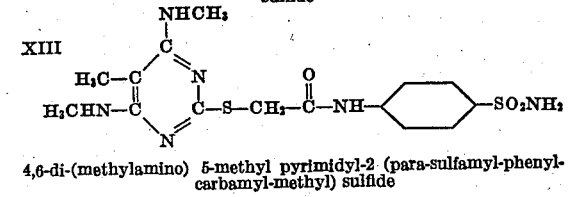

4,6-di-(methylamino) 5-methyl pyrimidyl-2 (para-sulfamyl-phenyl-carbamyl-methyl) sulfide XIV 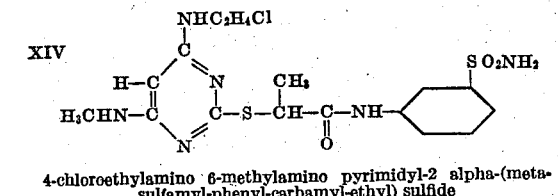

4-chloroethylamino 6-methylamino pyrimidyl-2 alpha-(meta-sulfamyl-phenyl-carbamyl-ethyl) sulfide XV 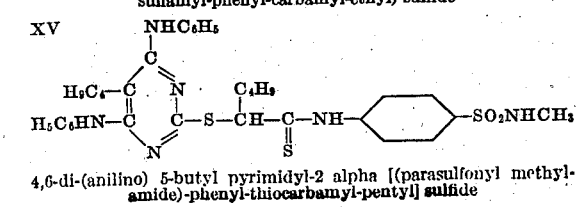

4,6-di-(anilino) 5-butyl pyrimidyl-2 alpha [(parasulfonyl methyl-amide)-phenyl-thiocarbamyl-pentyl] sulfide XVI 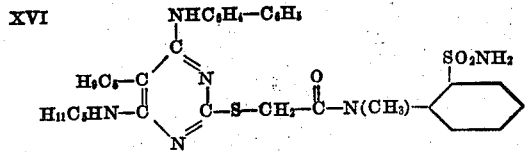

4-xenylamino 5-cyclopentyl 6-pentylamino pyrimidyl-2 ortho-sulfamyl-phenyl-(methyl)-carbamyl-methyl sulfide XVII 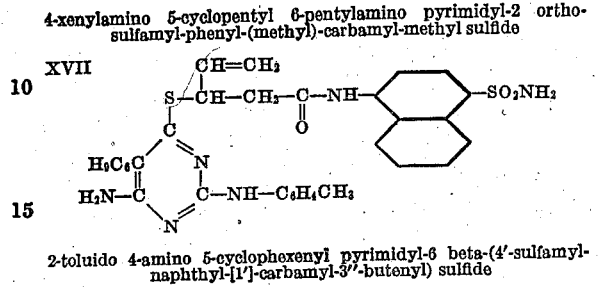

2-toluido 4-amino 5-cyclohexenyl pyrimidyl-6 beta-(4'-sulfamyl-naphthyl-[1']-carbamyl-3''-butenyl) sulfide XVIII 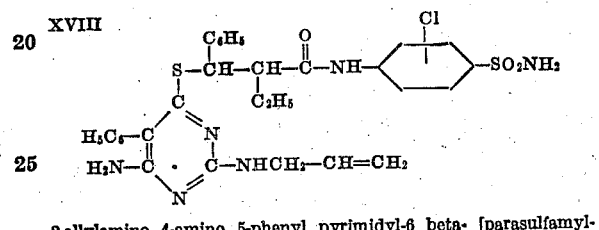

2-allylamino 4-amino 5-phenyl pyrimidyl-6 beta- [parasulfamyl-chlorophenyl-carbamyl-(alpha-ethyl beta-phenyl)-ethyl] sulfide XIX 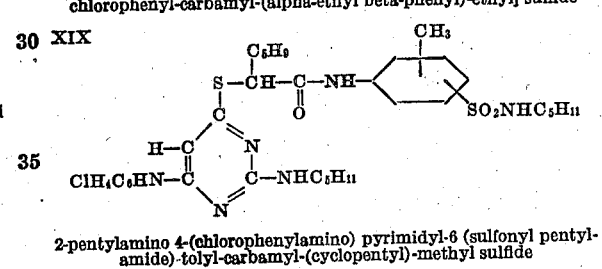

2-pentylamino 4-(chlorophenylamino) pyrimidyl-6 (sulfonyl pentyl-amide)-tolyl-carbamyl-(cyclopentyl)-methyl sulfide XX 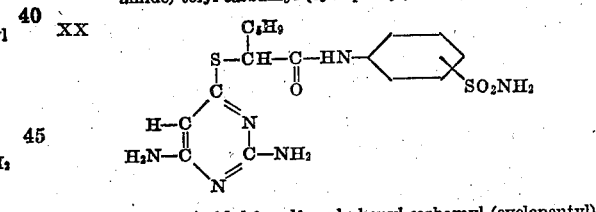

2,4-diamino pyrimidyl-6 sulfamyl-phenyl-carbamyl-(cyclopentyl)-methyl sulfide

XXI 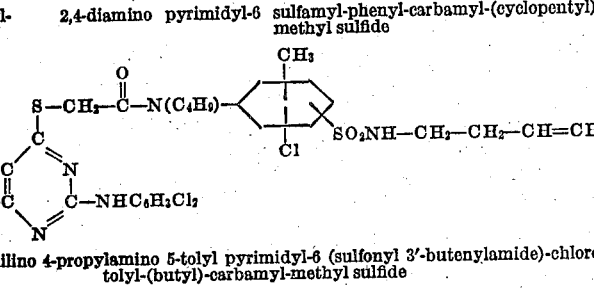

2-dichloroanilino 4-propylamino 5-tolyl pyrimidyl-6 (sulfonyl 3'-butenylamide)-chloro-tolyl-(butyl)-carbamyl-methyl sulfide XXII 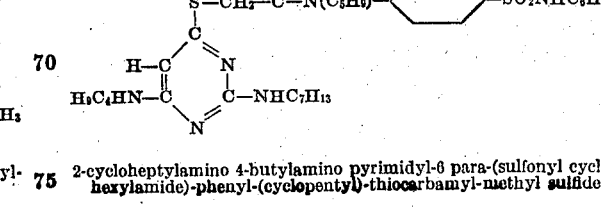

2-cycloheptylamino 4-butylamino pyrimidyl-6 para-(sulfonyl cyclo-hexylamide)-phenyl-(cyclopentyl)-thiocarbamyl-methyl sulfide XXIII 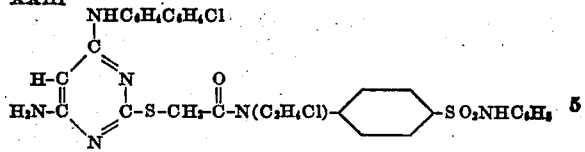

4-amino 6-chloroxenylamino pyrimidyl-2 para-(sulfonyl phenyl-amide)-phenyl-(chloroethyl)-carbamyl-methyl sulfide XXXI 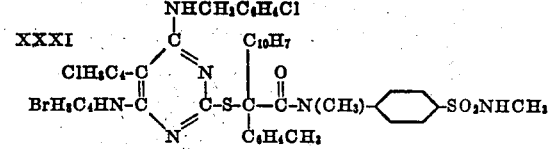

4-bromobutylamino 5-chlorobutyl 6-chlorobenzylamino pyrimidyl-2 para-(sulfonyl methylamide)-phenyl-(methyl)-carbamyl-(naphthyl)-(tolyl)-methyl sulfide XXIV 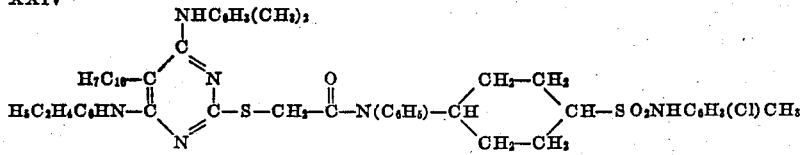

4-xylidino 5-naphthyl 6-ethylanilino pyrimidyl-2 (4'-sulfonyl chlorotolylamide)-cyclohexyl-(phenyl)-carbamyl-methyl sulfide XXV 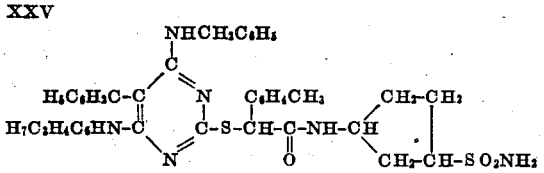

4-propylanilino 5-benzyl 6-benzylamino pyrimidyl-2 3'- sulfamyl-cyclopentyl-carbamyl-(tolyl)-methyl sulfide Additional examples of chemical compounds of this invention, the formulas for which will be apparent to those skilled in the art, are:

4,6-diamino pyrimidyl-2 ortho-sulfamyl-tolyl-thiocarbamyl-methyl sulfide
4,6-diamino pyrimidyl-2 meta-sulfamyl-tolyl-thiocarbamyl-methyl sulfide
2,6-diamino pyrimidyl-4 ortho-sulfamyl-phenyl-carbamyl-methyl sulfide XXVI 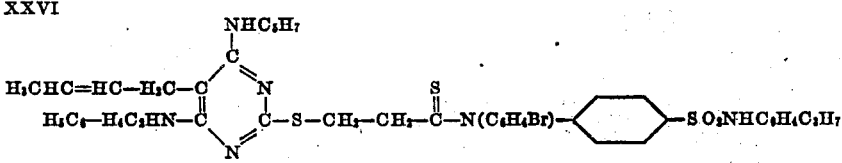

4-cyclopentenylamino 5-(2'-butenyl) 6-phenethylamino pyrimidyl-2 beta-[(para-sulfonyl propylphenylamide)-phenyl-(bromophenyl)-thiocarbamyl-ethyl] sulfide XXVII 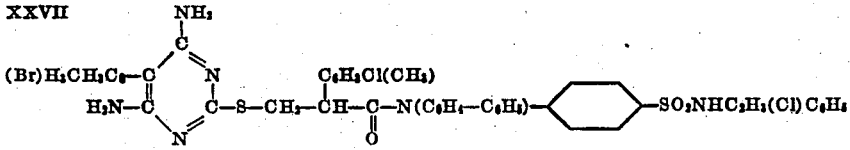

4,6-diamino 5-bromotolyl pyrimidyl-2 beta-[(parasulfonyl phenylchloroethylamide)-phenyl-(xenyl)-carbamyl-(alpha-chlorotolyl)-ethyl] sulfide XXVIII 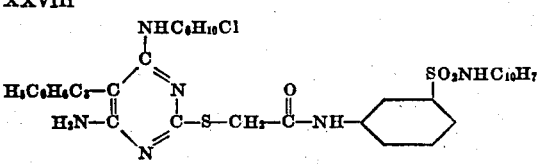

4-amino 5-phenylpropyl 6-chlorocyclohexylamino pyrimidyl-2 meta-(sulfonyl naphthylamide)-phenyl-carbamyl-methyl sulfide XXIX 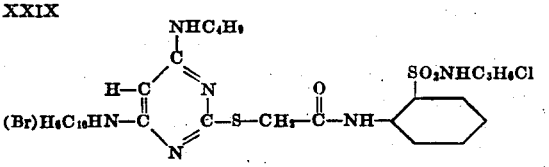

4-butylamino 6-bromonaphthylamino pyrimidyl-2 ortho-(sulfonyl chloropropylamide)-phenyl-carbamyl-methyl sulfide XXX 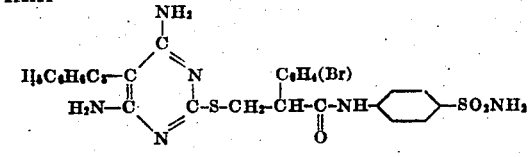

4,6-diamino 5-phenylpropyl pyrimidyl-2 beta-[para-sulfamyl-phenyl-carbamyl-(alpha-bromophenyl)-ethyl] sulfide 2,6-diamino pyrimidyl-4 ortho-sulfamyl-phenyl-thiocarbamyl-methyl sulfide
2,6-diamino pyrimidyl-4 meta-sulfamyl-phenyl-carbamyl-methyl sulfide
2,6-diamino pyrimidyl-4 para-sulfamyl-phenyl-thiocarbamyl-methyl sulfide
2,6-diamino pyrimidyl-4 beta-(ortho-sulfamyl-phenyl-carbamyl-ethyl) sulfide
4,6-diamino pyrimidyl-2 beta-(ortho-sulfamyl-phenyl-carbamyl-ethyl) sulfide
2,6-diamino pyrimidyl-4 beta-(meta-sulfamyl-phenyl-carbamyl-ethyl) sulfide
2,6-diamino pyrimidyl-4 beta-(para-sulfamyl-phenyl-carbamyl-ethyl) sulfide
2,6-diamino pyrimidyl-4 beta-(ortho-sulfamyl-phenyl-thiocarbamyl-ethyl) sulfide
2,6-diamino pyrimidyl-4 alpha-(para-sulfamyl-phenyl-carbamyl-ethyl) sulfide
4,6-diamino pyrimidyl-2 alpha-(meta-sulfamyl-phenyl-carbamyl-ethyl) sulfide
4,6-diamino pyrimidyl-2 alpha-(ortho-sulfamyl-phenyl-thiocarbamyl-ethyl) sulfide
4,6-diamino pyrimidyl-2 alpha-(para-sulfamyl-tolyl-carbamyl-ethyl) sulfide In a manner similar to that described above with particular reference to the production of sulfamyl-carbocyclic-carbamyl and -thiocarbamyl sulfur derivatives of the 1,3- or metadiazines (pyrimidines), the corresponding derivatives of the 1,2- or ortho-diazines (pyridazines) and of the 1,4- or para-diazines (pyrazines) may be prepared. It also will be understood by those skilled in the art from the foregoing description of the preparation of a diazine monosulfide

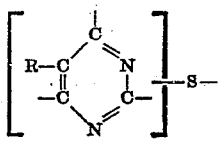

that similar compounds may be prepared in which two or three sulfur atoms are attached directly to a carbon atom of the diazine nucleus, thus:

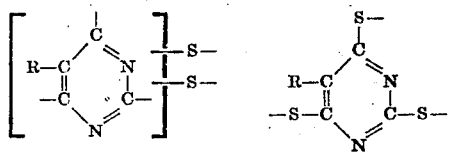

What I claim as new and desire to secure by Letters Patent of the United States is:

1. Chemical compounds corresponding to the general formula

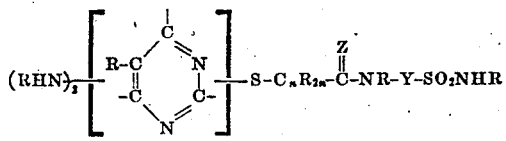

where $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and halohydrocarbon radicals.

2. Chemical compounds as in claim 1 wherein R represents hydrogen.

3. Chemical compounds as in claim 1 wherein R represents hydrogen, Z represents oxygen and $n$ is 1.

4. Chemical compounds corresponding to the general formula

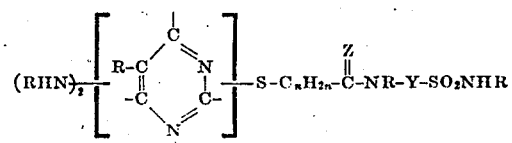

where $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and halohydrocarbon radicals.

5. Chemical compounds corresponding to the general formula

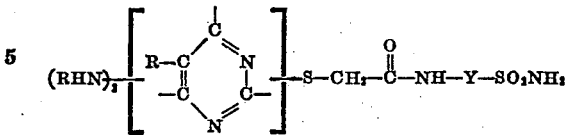

where Y represents a divalent carbocyclic radical, and R represents a member of the class consisting of hydrogen and monovalent hydrocarbon and halo-hydrocarbon radicals.

6. A diamino pyrimidyl sulfamyl-carbocyclic-carbamyl-methyl sulfide.

7. A 4,6-diamino pyrimidyl-2 sulfamyl-phenyl-carbamyl-methyl sulfide.

8. 4,6-diamino pyrimidyl-2 para-sulfamyl-phenyl-carbamyl-methyl sulfide.

9. A 4,6-diamino pyrimidyl-2 sulfamyl-tolyl-carbamyl-methyl sulfide.

10. A diamino pyrimidyl sulfamyl-carbocyclic-thiocarbamyl-methyl sulfide.

11. A diamino pyrimidyl sulfamyl-phenyl-thiocarbamyl-methyl sulfide.

12. The method of preparing chemical compounds corresponding to the general formula

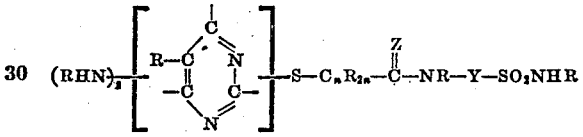

where $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and halo-hydrocarbon radicals, said method comprising effecting reaction, in the presence of a hydrohalide acceptor, between (1) a mercapto pyrimidine corresponding to the general formula

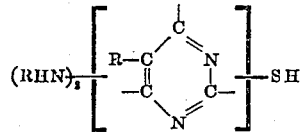

where R has the meaning above given, and (2) a halide corresponding to the general formula

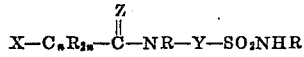

where X represents halogen, and $n$, Z, Y and R have the meanings above given.

13. A method as in claim 12 wherein the hydrohalide acceptor is an alkali-metal hydroxide.

14. The method of preparing 4,6-diamino pyrimidyl - 2 para - sulfamyl - phenyl-carbamyl-methyl sulfide which comprises effecting reaction, in the presence of a hydrohalide acceptor, between 2-mercapto 4,6-diamino pyrimidine and para-(chloroacetamido) benzene sulfonamide.

GAETANO F. D'ALELIO.

Certificate of Correction

Patent No. 2,312,691. March 2, 1943.

GAETANO F. D'ALELIO

It is hereby certified that errors appear in the printed specification of the above numbered patent requiring correction as follows: Page 1, second column, line 46, for "sulfiide" read *sulfide*; page 3, second column, lines 9–10, for "pyrimdine" read *pyrimidine*; page 4, second column, line 20, for "pyrimidyl" read *pyrimidyl-2*; page 5, first column, line 49, Formula XIII, strike out the parentheses before and after "para-sulfamyl-phenyl-carbamyl-methyl"; line 75, Formula XV, for "alpha [(para-sulfonyl" read *alpha-[(para-sulfonyl*; and second column, line 13, Formula XVII, for that portion reading 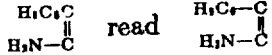 line 17, for "5-cyclophexenyl" read *5-cyclohexenyl*; line 28, Formula XVIII, for "parasulfamyl-" read *para-sulfamyl-*; lines 41–42, Formula XX, for that portion reading  page 6, line 47, Formula XXVII, for "parasulfonyl" read *para-sulfonyl*; and that the said Letters Patent should be read with these corrections therein that the same may conform to the record of the case in the Patent Office.

Signed and sealed this 8th day of June, A. D. 1943.

[SEAL]

HENRY VAN ARSDALE,
*Acting Commissioner of Patents.*